United States Patent [19]

Pfeiffer

[11] Patent Number: 4,585,631

[45] Date of Patent: Apr. 29, 1986

[54] METHOD FOR THE CONVERSION OF NITROGEN OXIDES CONTAINED IN GASEOUS PRODUCTS OF COMBUSTION

[75] Inventor: Roland Pfeiffer, Essen, Fed. Rep. of Germany

[73] Assignee: Ruhrgas Aktiengesellschaft, Essen, Fed. Rep. of Germany

[21] Appl. No.: 694,993

[22] Filed: Jan. 25, 1985

[30] Foreign Application Priority Data

Jan. 27, 1984 [DE] Fed. Rep. of Germany ....... 3402771

[51] Int. Cl.$^4$ .............................................. C01B 21/00
[52] U.S. Cl. ................................... 423/235; 423/239; 204/157.3
[58] Field of Search ................... 423/235, 235 D, 239, 423/239 A; 204/157.1 R, 157.1 H, 157.1 P

[56] References Cited

FOREIGN PATENT DOCUMENTS

| 5198670 | 8/1976 | Japan | 423/235 |
| 5637029 | 4/1981 | Japan | 423/239 |

*Primary Examiner*—Gregory A. Heller
*Attorney, Agent, or Firm*—Beall Law Offices

[57] ABSTRACT

A reducing agent such as preferably ammonia ($NH_3$) is blended in a reaction chamber with gaseous products of combustion for the conversion of the nitrogen oxides ($NO_x$) contained in the products of combustion into innoxious flue gas components. To accelerate the rate of reaction, the reactivity of the reducing agent is increased by the input of energy preferably by radiation of coherent light emitted by a laser. The necessary rate of conversion can thereby be achieved without the use of catalysts associated with undesired side effects.

10 Claims, No Drawings

METHOD FOR THE CONVERSION OF NITROGEN OXIDES CONTAINED IN GASEOUS PRODUCTS OF COMBUSTION

BACKGROUND OF THE INVENTION

1. Field of the Invention

The present invention relates to the treatment of gaseous products of combustion and concerns a method for the conversion of nitrogen oxides ($NO_x$) contained in such gaseous products of combustion into innoxious flue gas constituents by blending said products of combustion with a reducing agent in a reaction chamber.

2. Prior Art

Products of combustion contain, among other substances, oxides of nitrogen ($NO_x$) including nitrogen monoxide (NO) and nitrogen dioxide ($NO_2$) which are rated as pollutants and may not only be the cause of unpleasant odors but also have toxic effects on humans and animals. The decomposition of such nitrogen oxides ($NO_x$) by reacting said nitrogen oxides with a reducing agent such as ammonia ($NH_3$) to form non-polluting substances such as nitrogen and water ($N_2$ and $H_2O$) at an appropriate rate of conversion necessitates the incorporation of a catalyst in the reaction chamber to increase the rate of reaction, thereby increasing the cross-section required for the flue gas passages. Such catalysts also tend to be polluted by particles contained in products of combustion clogging the catalyst thereby reducing the open passages for the flow of said products of combustion and decreasing catalytic activity. Said catalytic activity may also deteriorate as a result of catalyst poisoning matter contained in the fuel and introduced into the catalyst by way of the products of the combustion of said fuel.

DESCRIPTION OF THE INVENTION

It is an object of the present invention to provide for a method for the conversion of nitrogen oxides contained in gaseous products of combustion not necessitating the employment of a catalyst to achieve the rate of reaction required for said conversion process.

According to the present invention, the products of combustion to be treated are blended with a reducing agent suitable for said conversion, the reactivity of said reducing agent having been increased by an input of energy prior to, during or after the step of blending said reducing agent with said products of combustion to be treated. Unlike prior catalytic methods, the conversion method proposed by the present invention prevents the deterioration of the effectiveness of the conversion process over time as a result of dirt contained in products of combustion or catalyst poisoning and allows the control of the rate of the conversion reaction by controlling the amount of energy transmitted to said reducing agent thereby providing a means for controlling or reducing the duration of the treatment of said products of combustion in the reaction chamber provided.

In one of the embodiments of the present invention, the energy may be transmitted to the molecules of said reducing agent inside said reaction chamber but it is preferred that the energy is transmitted to said reducing agent during or immediately prior to the introduction of said reducing agent into said reaction chamber before said reducing agent has been blended with the products of combustion to be treated as it is merely necessary to activate the molecules of said reducing agent by the input of energy, thereby reducing the size and hence the cost of the means used for the transfer of energy to said reducing agent.

Said reducing agent may be a gas or a liquid.

In a preferred embodiment of the present invention, the reducing agent used is ammonia ($NH_3$) which may or may not be in solution in water ($H_2O$), but said reducing agent may also be synthesis gas ($CO+H_2$), methane ($CH_4$), any higher hydrocarbon such as liquefied petroleum gas or any mixture of any of said substances.

The transmission of energy provided for by the present invention may be achieved by the exposure of the molecules of said reducing agent to an electric, an electromagnetic or an electrostatic field which should preferably be an alternating field but energy transfer may also be by thermal radiation, convection or any other method of energy transmission.

In a preferred embodiment of the present invention, the energy is transferred to the reducing agent by means of radiation and preferably by the radiation of coherent light emitted by at least one laser (laser radiation). Said radiation may be generated by a pulsed solid laser or a continuous gas laser.

Alternatively, ionizing radiation sources such as X-ray generators or other sources of radioactive radiation may be used for transmitting energy to the reducing agent.

In order to ensure that substantially all the reducing agent will contribute to the conversion reaction, the radiation should preferably be distributed over a relatively wide area and brought to act upon substantially all the reducing agent flowing to the reaction chamber and/or all the mixture of the products of combustion and the reducing agent.

The method invented allows an optimization of the control of the conversion by means of controlling or dosing energy transfer and/or reducing agent flow such that substantially all of the nitrogen oxides contained in the products of combustion and substantially all of the reducing agent will be converted.

There is a very large variety of physical embodiments applying the methods invented, as energy input may take place at any point of the system.

It can therefore be seen that according to the invention, there is provided a method for the conversion of nitrogen oxides ($NO_x$) contained in gaseous products of combustion into innoxious flue gas constituents by blending said products of combustion with a reducing agent, the reactivity whereof is increased according to the present invention by means of energy input by any method of energy transfer such as laser radiation. Said laser beams may act upon a liquid or gaseous reducing agent across the wall of a pipeline or a chamber through which laser beams may pass.

I claim:

1. A method for the treatment of combustion products containing at least one nitrogen oxide comprising:
   providing said flue gas combustion products;
   providing a reducing agent selected from the group consisting of ammonia ($NH_3$), synthesis gas ($CO+H_2$), methane ($CH_4$), higher hydrocarbons and a mixture of said reducing agents;
   irradiating said reducing agent with radiant energy emitted by at least one laser to increase the ractivity or the reducing agent; and thereafter
   blending only said products of combustion and said irradiated reducing agent in a reaction chamber to convert said at least one nitrogen oxide into innoxious flue gas constituents.

2. A method according to claim 1 wherein said reducing agent is in solution in a solvent.

3. A method according to claim 2 wherein said solvent is water.

4. A method according to claim 1 wherein said reducing agent is in the liquid state.

5. A method according to claim 1 wherein said reducing agent is in the gaseous state.

6. A method according to claim 1 wherein said reducing agent is exposed to laser radiation before said reducing agent is blended with the products of combustion to be treated; said laser radiation irradiating substantially all of the molecules of said reducing agent before reaching said reaction chamber.

7. A method according to claim 1 wherein said reducing agent is irradiated immediately prior to blending in said reaction chamber.

8. A method according to claim 1 wherein said reducing agent flows through pipework through which laser radiation may pass and substantially the entire cross section of said pipework is exposed to a radiation of coherent light emitted by at least one laser.

9. A method according to claim 1 wherein said laser radiation is generated by a pulsed solid laser.

10. A method according to claim 1 wherein said laser radiation is generated by a continuous gas laser.

* * * * *